Oct. 29, 1929.     R. P. SIDDENS     1,733,517
STOCK LOADING CHUTE
Filed June 29, 1928     2 Sheets-Sheet 1

Robert P. Siddens
Inventor

By Clarence A. O'Brien
Attorney

Oct. 29, 1929.    R. P. SIDDENS    1,733,517
STOCK LOADING CHUTE
Filed June 29, 1928    2 Sheets-Sheet 2

Inventor
Robert P. Siddens
By Clarence A. O'Brien
Attorney

Patented Oct. 29, 1929

1,733,517

UNITED STATES PATENT OFFICE

ROBERT P. SIDDENS, OF MASON, ILLINOIS

STOCK-LOADING CHUTE

Application filed June 29, 1928. Serial No. 289,168.

This invention relates to new and useful improvements in chutes whereby to facilitate the loading and unloading of stock upon or from an automobile truck, freight car or the like and aims to provide a chute of this character that may be readily collapsed so as to facilitate its storage within the truck or car without taking up much space therein.

Furthermore the invention aims to provide such a chute that is of relatively simple construction and inexpensive to manufacture, the same embodying but two parts to be so correlated as to reduce possibility of disarrangement to a minimum.

With the foregoing and other objects in view as the nature of the invention will be better understood, the same comprises the novel form, combination and arrangement of parts hereinafter more fully described, shown in the accompanying drawings and claimed.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views.

Figure 1:
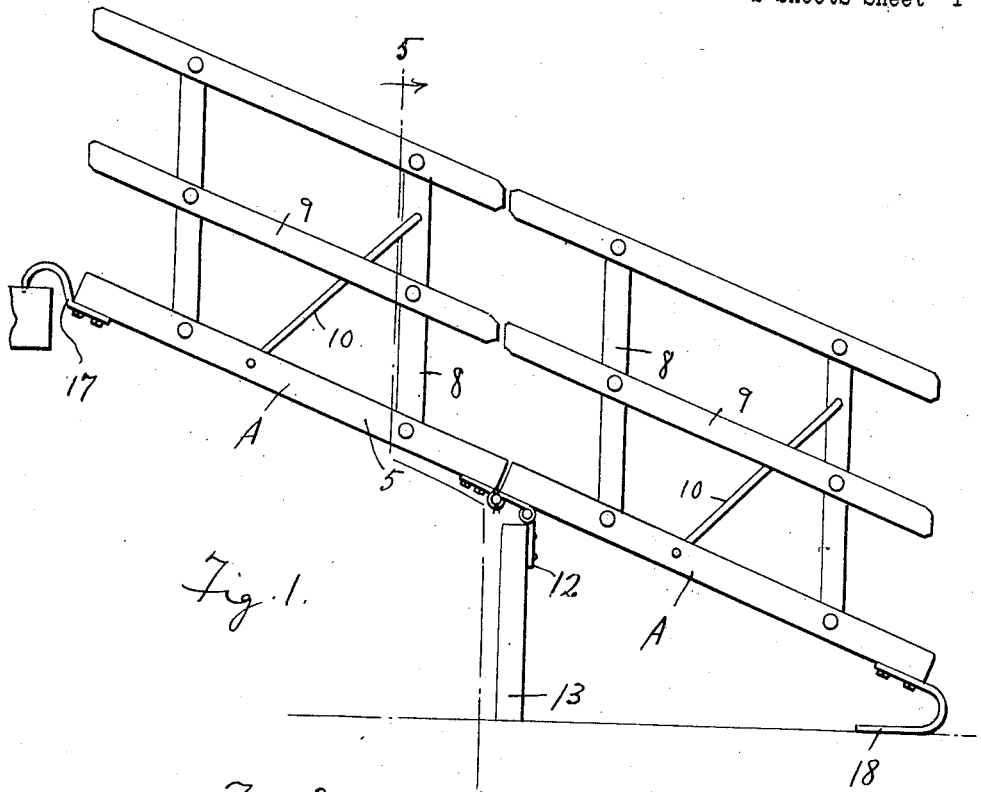
Figure 1 is a side elevation of my improved chute in set up position.
Figure 2:
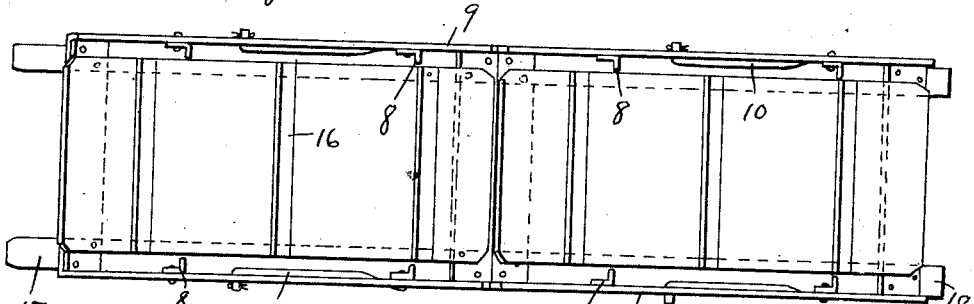
Figure 2 is a top plan view thereof.

Now having particular reference to the drawing my novel chute consists of a pair of similarly constructed sections designated broadly by the reference characters A—A.

Each section consists of a pair of side channel bars 5—5 between which is arranged a floor board 6 the adjacent ends of the floor boards of the two sections being hingedly interconnected as at 7.

Figure 3:
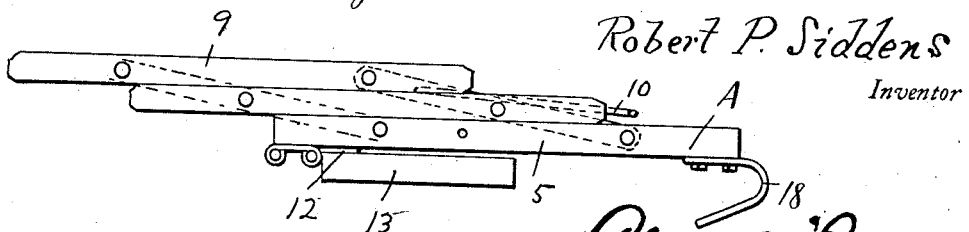
Figure 3 is a side elevation showing the two in entirely collapsed condition.

Pivotally secured at their lower ends to the side rails of each section is a pair of spaced angle bars 8—8, these angle bars being interconnected by longitudinally extending straps 9—9 pivoted to the angle bars as disclosed so as to facilitate the folding downwardly of the angle bars and said strap with respect to the side rails 5—5 of the sections as disclosed in Figure 3.

Figure 4:
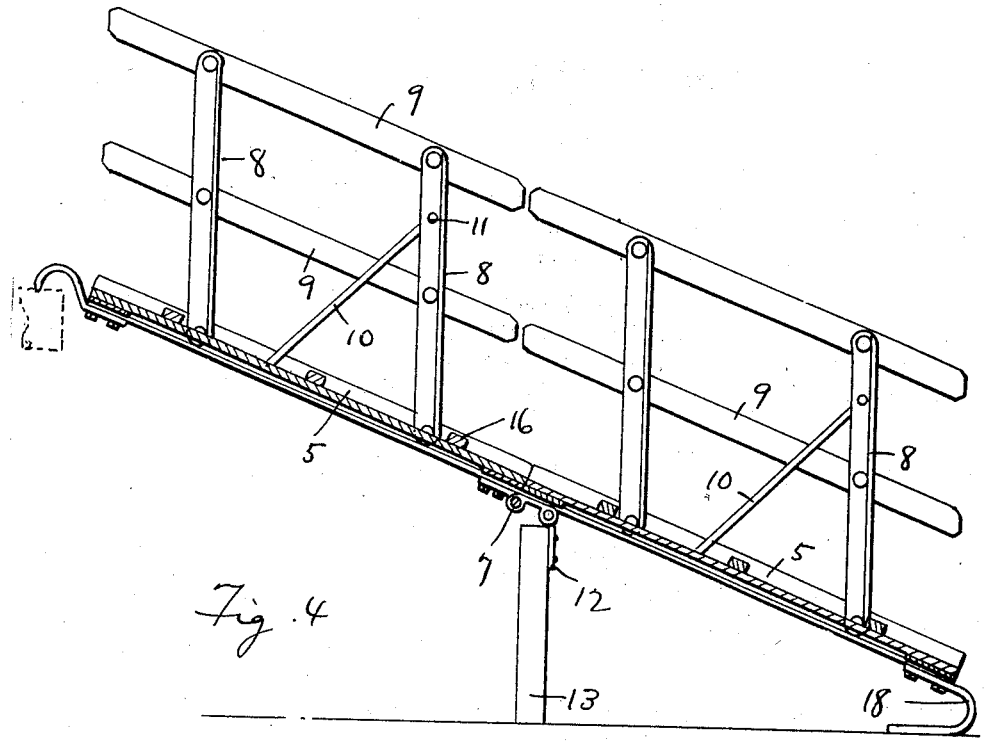
Figure 4 is a detail longitudinal section of the chute in set up condition.

Loosely pivotally secured to each side bar 5 of each section A—A and intermediate the pivotal angle bars 8—8 is a tie rod 10, the upper end thereof being provided with an inturned pin 11 for engagement within an opening in the rearmost angle bar 8 to prevent the collapsing of the section when in set up position as disclosed in Figures 1 and 4.

Figure 5:
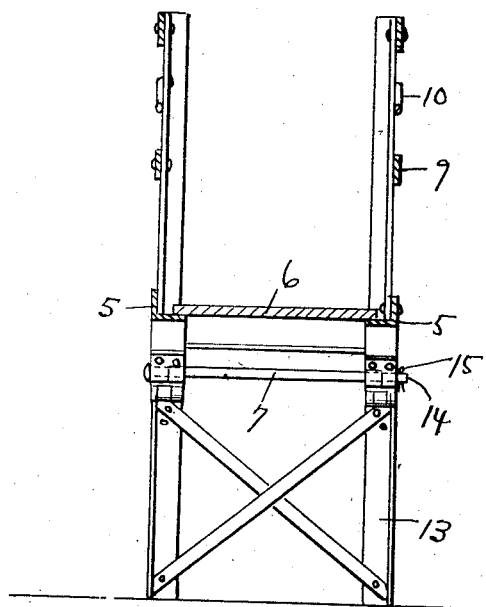
Figure 5 is a detail vertical transverse section taken substantially upon the line 5—5 of Figure 1 and looking rearwardly in the direction of the arrows.

Hinged to the rear strap of the section connecting hinges are depending metallic straps 12—12 which are secured to the upper end of angle bar braces 13—13 for supporting the intermediate point of the chute when in set up condition and as clearly illustrated in Figures 1, 4 and 5.

The complementary strap of the hinges 7—7 are interconnected by a common elongated pin 14 headed at one end and provided at its opposite end with an opening for receiving a cotter pin 15.

Obviously when it is desired to separate the section prior to the folding of the same as disclosed in Figure 3 the pin 14 is removed and after releasing the tie rod 10 from the rearmost angle bars said sections may be clamped as disclosed in said Figure 3.

The floor boards of the sections may be and preferably are provided with cross plates 16 while the forward ends of the side rails of the front section A are equipped with hooks 17 for engagement within the material of the truck or car. The outer ends of the side rails of the lower section are provided with suitable leaf spring supports 18 adapted for engagement upon the road surface or earth and for providing a cushion support for the lower end of the chute as disclosed.

It will thus be seen that I have provided a novel, simple and useful collapsible stock chute that is well adapted for all of the purposes heretofore designated.

Even though I have herein shown and described the invention as consisting of certain detail structural elements, it is nevertheless to be understood that minor changes may be made therein without affecting the spirit and scope of the appended claim.

Having thus described my invention, what I claim as new is:

A stock loading chute of the character described comprising a pair of complementary sections each consisting of longitudinally extending side rails and a floor board therebetween, a detachable hinged connection between the adjacent ends of said sections, longitudinally collapsible side walls extending vertically with respect to the side rails of each section, means for maintaining the side walls in upright position, means at the inner end of one of said sections whereby the chute may be supported at its intermediacy in operative position, and means associated with the inner end of the uppermost section whereby to facilitate the securing of the last mentioned section to the truck or car.

In testimony whereof I affix my signature.

ROBERT P. SIDDENS.